United States Patent [19]

Sakai et al.

[11] Patent Number: 4,600,981

[45] Date of Patent: Jul. 15, 1986

[54] MARGIN ANGLE RESPONSIVE METHOD AND APPARATUS FOR CONTROLLING REACTIVE POWER IN A HVDC SYSTEM

[75] Inventors: Takami Sakai; Koji Imai, both of Tokyo, Japan

[73] Assignee: Kabushiki Kaisha Toshiba, Kawasaki, Japan

[21] Appl. No.: 724,919

[22] Filed: Apr. 19, 1985

[30] Foreign Application Priority Data

May 8, 1984 [JP] Japan .................................. 59-91223

[51] Int. Cl.[4] .............................................. H02J 3/36
[52] U.S. Cl. ......................................... 363/35; 323/209
[58] Field of Search ................... 363/35; 323/207, 209

[56] References Cited

U.S. PATENT DOCUMENTS 3,424,971  1/1969  Stackegard ........................ 323/209

FOREIGN PATENT DOCUMENTS

| 67978 | 12/1982 | European Pat. Off. .............. 363/35 |
| 41-13539 | 7/1966 | Japan . | |
| 16315 | 1/1983 | Japan .................................. 323/209 |
| 29029 | 2/1983 | Japan .................................... 363/35 |

OTHER PUBLICATIONS

Nishimura et al., "Constant Power Factor Control System for HVDC Transmission," IEEE Trans. on Pwr. App. & Syst., vol. PAS-95, No. 6, pp. 1845-1853, Nov./Dec. 76.

International Conference on DC Power Transmission, Jun. 4-8, 1984, "Design and Control Strategies of HVDC Schemes for AC Voltage Control and Stabilization", BBC Brown Boveri & Co. Ltd.

Direct Current; Sep. 1956, p. 55.

Primary Examiner—William H. Beha, Jr.
Attorney, Agent, or Firm—Oblon, Fisher, Spivak, McClelland & Maier

[57] ABSTRACT

A control method of the invention is formed with the steps of when a margin angle $\gamma$ reaches a given minimum margin angle $\gamma$min during the operation of a rectifier and inverter, a shunt reactor is disconnected from, or a shunt capacitor is connected to, an AC line of the inverter, and when the margin angle $\gamma$ exceeds the minimum margin angle $\gamma$min by a predetermined value, the shunt reactor is connected to, or the shunt capacitor is disconnected from, the AC line.

10 Claims, 7 Drawing Figures

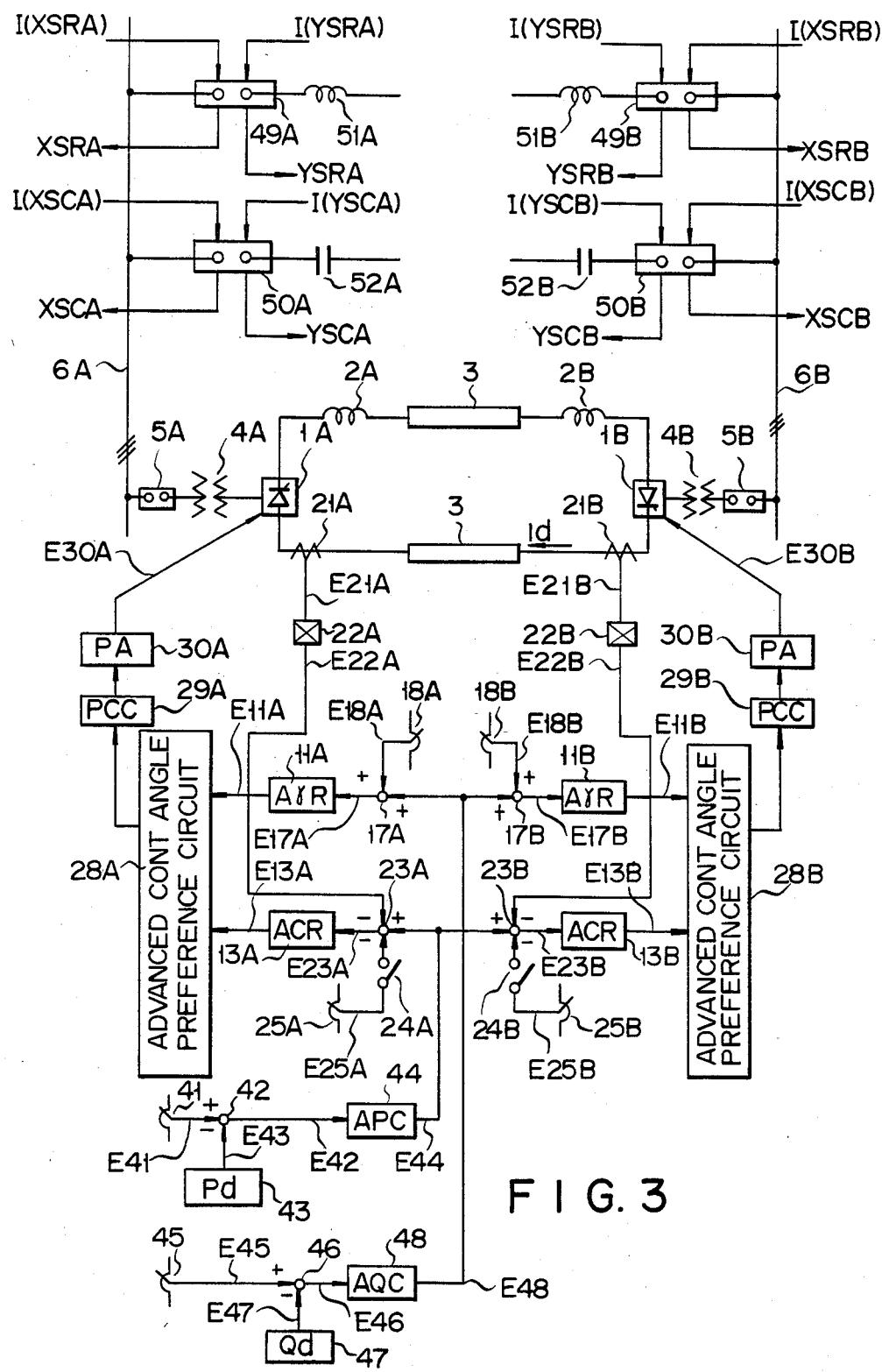
F I G. 3

MARGIN ANGLE RESPONSIVE METHOD AND APPARATUS FOR CONTROLLING REACTIVE POWER IN A HVDC SYSTEM

BACKGROUND OF THE INVENTION

The present invention relates to a control method of phase modifying equipment for a DC power transmission system or for a frequency conversion system, and to a control apparatus utilizing this control method.

A conventional DC power transmission system is formed with a forward converter (rectifier) which converts AC power from an AC line into DC power, a DC power transmission line which transfers the converted DC power to another place, and a reverse converter (inverter) located at another place, which converts the transmitted DC power into another AC power and supplies the converted AC power to another AC line.

Such a DC power transmission system has an operation characteristic as shown in FIG. 1. In FIG. 1, the abscissa denotes a DC current Id of the DC power transmission line and the ordinate denotes a DC voltage ED thereof.

Referring to FIG. 1, portions (a), (b) and (c) are an operation curve of a rectifier. Portions (a) and (b) define a regulation characteristic of the rectifier. Portions (b) and (c) define a constant current characteristic of the rectifier. Portions (d), (e) and (f) are an operation curve of an inverter. Portions (d) and (e) define a constant current characteristic of the inverter. Portions (e) and (f) define a constant margin angle characteristic of the inverter. The difference between DC currents at portions (c) and (d) represents a current margin of the DC power transmission system.

The combination of the above rectifier and inverter is operated at a point X in FIG. 1. Point X is defined by the intersection between the operation curves of the rectifier and inverter. As may be seen from the operation curves in FIG. 1, the DC power transmission system is controlled such that the inverter determines DC voltage Ed of the power transmission line while the rectifier determines DC current Id thereof.

Both of the above rectifier and inverter serve as a phase-delayed load for the AC line. Also, the power factor of the rectifier and inverter is substantially proportional to the cosine of a control angle.

Assume that a reference margin angle which determines the constant margin angle characteristic of the inverter is enhanced to increase the phase-delayed reactive power of the inverter, and both the rectifier and inverter are operated at point X in FIG. 1.

In this case, DC voltage Ed is decreased, and the operation curve of the inverter shifts from portions (d), (e) and (f) to portions (dd), (ee) and (ff). Meanwhile, DC current Id is increased to compensate the decrease in DC voltage Ed so that a constant power transmission is achieved. Then, the operation curve of the rectifier is shifted from portions (a), (b) and (c) to portions (a), (bb) and (cc), and the operating point of the rectifier/inverter is shifted from point X to a point XX. (Since the transmission power is defined by the a product of DC voltage Ed and DC current Id, the curve of constant power becomes hyperbolic and the operating point of the rectifier/inverter is fixed on such a hyperbolic curve HC, as shown in FIG. 1).

Conventionally, AC lines coupled to the DC power transmission system are provided with shunt reactors and shunt capacitors. The circuit connection of these shunt reactors and shunt capacitors is controlled according to the value of transmission power. For instance, when the transmission power is 30% or less of a rated power (100% power output), only the shunt reactor is connected to the AC line. When the transmission power falls within a power range of 30% to 70% of the rated power, both of the shunt reactor and shunt capacitor are disconnected from the AC line. Within a power range of 70% or more, only the shunt capacitor is connected to the AC line.

The above connection control of shunt reactor/shunt capacitor is sufficient in a case where a DC voltage control or margin angle control is effected without performing a reactive power control or AC voltage control of the AC line. However, if a reactive power control is performed together with the DC voltage control or margin angle control, a certain problem has occurred. Such a problem will be discussed below.

FIG. 2 illustrates a reactive power controllable range of a conventional DC power transmission system. In FIG. 2, the abscissa denotes transmission power (detected active power) Pd and the ordinate denotes reactive power Q. The reference symbol "p.u" denotes a reference power (power unit) representing the 100% power output. In the following, for the sake of simplicity, it is assumed that shunt reactors have the same reactive power capacities as those of shunt capacitors. Further, AC filters being provided to eliminate high-frequency components from rectifier/inverter are considered as reactive power sources. The illustration of FIG. 2 contains the reactive power capacities of such AC filters.

Referring to FIG. 2, within the hatched region surrounded by points A, B, C, D and E, only a shunt capacitor is connected to the AC line of the inverter. Curve A - B indicates an active power-reactive power (P-Q) relationshp which is obtained by the system operation in accordance with a minimum margin angle $\gamma$min. Curve D - E indicates another P-Q relationshp which is obtained by the system operation in accordance with a maximum margin angle $\gamma$max and represents continuous operation at a rated current (100% current output) of the rectifier. Lines A - E and B - C respectively indicate the lower and upper limits of transmission power. Curve C - D indicates the limit of continuous operation with the rated (100%) current.

When a shunt capacitor is disconnected from the AC line of the inverter, the hatched region in FIG. 2 is parallel-shifted downward. When a shunt reactor is connected to the AC line, the above shifted region is further shifted downward in parallel to the former shift. Thus, the phase modifying control is effected by the selective connection of the shunt capacitor and/or shunt reactor. The reactive power controllable region in which the shunt reactor is connected and the shunt capacitor is disconnected is surrounded by points G, H, I, J and K.

According to a prior art control method as mentioned above, the shunt capacitor of the inverter side is connected at, e.g., a point DD in FIG. 2. Point DD corresponds to about 70% of the reference power "p.u". In this case, as may be seen from FIG. 2, the rectifier/inverter cannot operate in a region surrounded by points A, BB, CC, F and E. This means that the reactive power controllable region of the DC power transmission system is considerably narrowed by the operation of the above phase modifying control. This is a problem to be solved by the present invention. (A similar problem will be involved when the inverter is used as a frequency converter.)

SUMMARY OF THE INVENTION

It is accordingly an object of the present invention to provide a control method of phase modifying equipment for a DC power transmission system or for a frequency conversion system, in which a reactive power controllable range is effectively expanded.

Another object of the invention is to provide a control apparatus utilizing the above control method.

To achieve the former object, a control method of the invention includes the steps of:

when a margin angle $\gamma$ reaches a given minimum margin angle $\gamma$min during the operation of a rectifier-/inverter, a shunt reactor is disconnected from (or a shunt capacitor is connected to) an AC line coupled to the inverter; and when the margin angle $\gamma$ exceeds the minimum margin angle $\gamma$min by a predetermined value $\Delta\gamma$, the shunt reactor is connected to (or the shunt capacitor is disconnected from) the AC line.

To achieve the latter object, a control apparatus of the invention includes means for performing the respective steps of the above control method.

According to the present invention, since the reactive power is changed during the margin angle control by the connection control of the shunt reactor or shunt capacitor, an inoperative region as indicated by points A, BB, CC, F and E in FIG. 2 can be minimized or eliminated.

BRIEF DESCRIPTION OF THE DRAWINGS

FIG. 3 is a schematic diagram of a power converter control apparatus with phase modifying equipment, to which a control method of the present invention is applied;

DETAILED DESCRIPTION OF THE PREFERRED EMBODIMENTS

Figure 1:
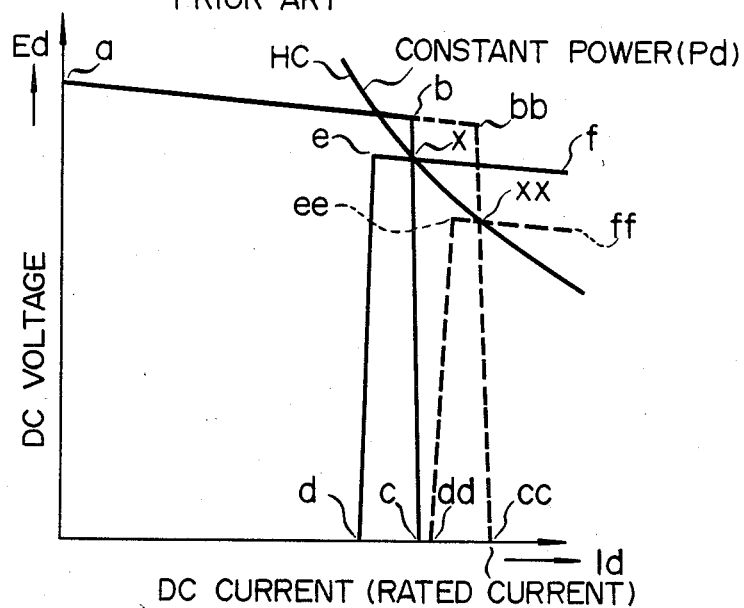
FIG. 1 shows an operation characteristic of a conventional DC power transmission system.

Hereinafter, preferred embodiments of the invention will be described in detail with reference to the accompanying drawings.

FIG. 3 is a schematic diagram of a power converter control apparatus with phase modifying equipment, to which a control method of the present invention is applied. Details of each element in FIG. 3 are known to a skilled person in the art. In FIG. 3, the DC circuit of a converter 1A is coupled via a DC reactor 2A, DC power transmission lines 3 and a DC reactor 2B to the DC circuit of a converter 1B. The AC circuit of converter 1A is coupled via a converter transformer 4A and a circuit breaker 5A to a 3-phase AC power line 6A. The AC circuit of converter 1B is coupled via a converter transformer 4B and a circuit breaker 5B to a 3-phase AC power line 6B.

In the following, elements of converter 1A side are mainly explained. For the sake of simplicity, similar elements in converter 1B side are referred by the bracketed reference numerals.

A shunt reactor 51A (51B) is coupled via a circuit breaker 49A (49B) to AC power line 6A (6B). Also, a shunt capacitor 52A (52B) is coupled via a circuit breaker 50A (50B) to AC power line 6A (6B). Breaker 49A (49B) is opened by an OFF instruction I(XSRA) (I(XSRB)) and is closed by an ON instruction I(YSRA) (I(YSRB)). When breaker 49A (49B) is in an opened state (OFF state), it generates an OFF signal XSRA (XSRB) having logic level "1". When breaker 49A (49B) is in a closed state (ON state), the logic level of OFF signal XSRA (XSRB) is "0", i.e., signal XSRA (XSRB) with logic "1" level disappears in the ON state of breaker 49A (49B). In this case, breaker 49A (49B) generates an ON signal YSRA (YSRB) having logic level "1". Similarly, breaker 50A (50B) is opened by an OFF instruction I(XSCA) (I(XSCB)) and is closed by an ON instruction I(YSCA) (I(YSCB)). When breaker 50A (50B) is in an opened state (OFF state), it generates an OFF signal XSCA (XSCB) having logic level "1". When breaker 50A (50B) is in a closed state (ON state), the logic level of OFF signal XSCA (XSCB) is "0" and an ON signal YSCA (YSCB) having logic level "1" is generated.

Converter 1A (1B) is associated with an automatic margin angle regulator 11A (11B) and an automatic current regulator 13A (13B).

Automatic margin angle regulator 11A (11B) is provided for a prescribed control operation that the margin angle $\gamma$ of converter 1A (1B) follows a given margin angle value E17A (E17B). According to this control operation, when value E17A (E17B) is fixed at a constant value, the margin angle $\gamma$ of converter 1A (1B) becomes constant. Value E17A (E17B) is obtained from an adder 17A (17B). Adder 17A (17B) receives a minimum margin angle value E18A (E18B) from a margin angle presetter 18A (18B) and an output E48 from an automatic reactive power control circuit 48. The minimum margin angle $\gamma$min of converter 1A (1B) is determined by value E18A (E18B). Output E48 is utilized to control the reactive power of AC line 6A (6B).

To achieve the reactive power control, circuit 48 is responsive to an output E46 from a subtracter 46. Subtracter 46 receives at its positive input an output E45 (reactive power reference) from a reactive power presetter 45 and at its negative input an output E47 from a reactive power detector 47. Detector 47 detects the magnitude of reactive power handled by converter 1A (1B). Thus, the reactive power is controlled in response to output E48 which represents the difference between E45 and E47, and the controlled reactive power follows the value of output E45.

In this manner, when the reactive power of AC line 6A (6B) at converter 1A (1B) side is to be controlled, the margin angle γ of converter 1B (1A) is controlled by output E48 so that the control angle of converter 1A (1B) is changed accordingly.

Incidentally, irrespective of the conversion functions (rectifying, inverting), converter 1A (1B) serves as a phase-delayed load for AC line 6A (6B), and the power factor of converter 1A (1B) is substantially proportional to the cosine of the delayed control angle.

Automatic current regulator 13A (13B) is provided for a prescribed control operation that the amount of a DC current Id flowing through power transmission lines 3 depends on a given current control value E23A (E23B). Value E23A (E23B) is obtained from a subtractor 23A (23B). Subtractor 23A (23B) receives at its first negative input an output E22A (E22B) from a current/voltage converter 22A (22B), at its second negative input a current margin value E25A (E25B) from a current margin presetter 25A (25B) via a switch 24A (24B), and at its positive input an output E44 from an automatic power control circuit 44. Converter 22A (22B) receives an output E21A (E21B) from a current transformer 21A (21B) arranged at DC line 3, and converts the received E21A (E21B) into output E22A (E22B). Only one of switches 24A and 24B, which allows the corresponding converter (1A or 1B) to operate as an inverter, is closed or turned on. According to the control operation of regulator 13A (13B), if output E44, which serves as a current reference, is fixed at a constant value, the amount of DC current Id becomes constant. Thus, DC current Id of lines 3 is controlled in accordance with output E44 from circuit 44.

Automatic power control circuit 44 is provided for controlling the power transfer between AC lines 6A and 6B. Circuit 44 is responsive to an output E42 from a subtractor 42. Subtractor 42 receives at its positive input an output E41 (active power reference) from a power presetter 41. The negative input of subtracter 42 receives an output E43 from a power detector 43 which detects the magnitude of power (active power) transmitted through DC lines 3. Thus, the power transfer is controlled in response to output E42 or E44 which represents the difference between E41 and E43, and the controlled power follows the value of output E41.

An output E11A (E11B) from automatic margin angle regulator 11A (11B) and an output E13A (E13B) from automatic current regulator 13A (13B) are supplied to an advanced control angle preference circuit 28A (28B). Circuit 28A (28B) selects either one of the supplied outputs in a manner that the control angle of the selected one is phase-advanced to the control angle of the non-selected one. The selected output from circuit 28A (28B) is converted via a phase control circuit 29A (29B) and pulse amplifier 30A (30B) into gate pulses E30A (E30B) which are used for triggering the switching elements in converter 1A (1B).

Figure 4:
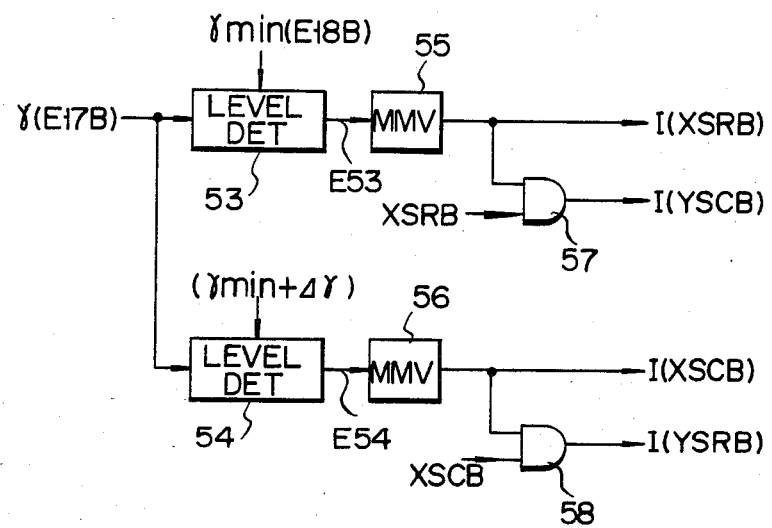
FIG. 4 shows a circuit for controlling the connection of a shunt reactor and shunt capacitor, which is an essential part of the present invention.

FIG. 4 shows a circuit for controlling the ON/OFF states of breakers 49B and 50B. Thus, the FIG. 4 circuit controls the circuit connection of shunt reactor 51B and shunt capacitor 52B. (The FIG. 4 circuit can be applied to control the circuit connection of shunt reactor 51A and shunt capacitor 52A.)

The margin angle γ of the power converter control apparatus may be obtained from value E17B (FIG. 3). The detected margin angle γ is supplied to level detectors 53 and 54. Detector 53 has a reference level γmin corresponding to the minimum margin angle. The reference level γmin may be obtained from minimum margin angle value E18B (FIG. 3). Detector 54 has another reference level γmin+Δγ which is obtained by adding value E18B to a given fixed value Δγ. When the signal level of the detected margin angle γ reaches the reference level γmin, detector 53 generates an output E53 having logic level "1". When the margin angle γ level exceeds the reference level γmin by the given fixed value Δγ, detector 54 generates an output E54 having logic level "1".

Output E53 is supplied to a monostable multivibrator (MMV) 55, and output E54 is supplied to a monostable multivibrator (MMV) 56. MMV 55 is triggered by the rising edge of output E53 and generates OFF instruction I(XSRB) having a pulse width of, e.g., a few hundred milliseconds. MMV 56 is triggered by the rising edge of output E54 and generates OFF instruction I(XSCB) having a pulse width of, e.g., a few hundred milliseconds. Instruction I(XSRB) is supplied to the first input of an AND gate 57. AND gate 57 receives at its second input the OFF signal XSRB. When the logic level of signal XSRB is "1", AND gate 57 generates ON instruction I(YSCB) in response to OFF instruction I(XSRB). Instruction I(XSCB) is supplied to the first input of an AND gate 58. AND gate 58 receives at its second input the OFF signal XSCB. When the logic level of signal XSCB is "1", AND gate 58 generates ON instruction I(YSRB) in response to OFF instruction I(XSCB).

Figure 5:
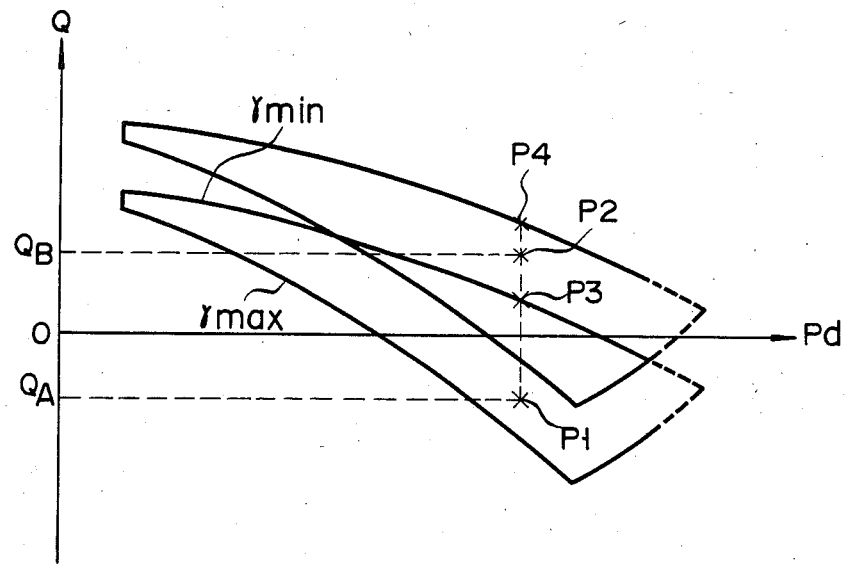
FIG. 5 is a graph showing the relationshp between transmission power (detected active power) Pd and reactive power Q, which is obtained by the operation of the FIG. 4 circuit and corresponds to the illustration of FIG. 2.

FIG. 5 is a graph showing the relationship between transmission power (detected active power) Pd and reactive power Q. This relationship is obtained by the operation of the FIG. 4 circuit and corresponds to the illustration of FIG. 2.

Referring to FIG. 5, the operating point of converters 1A (rectifier) and 1B (inverter) in FIG. 3 is assumed to be a point P1. At point P1, shunt reactor 51B and shunt capacitor 52B are both disconnected from AC line 6B. In this case, the logic level of each of signals XSRB and XSCB is "1". Assume that converters 1A and 1B have to be operated at a point P2 for a particular reason. In this case, a system operator changes the preset value (E45) of the reactive power from QA to QB by the manipulation of reactive power presetter 45. By the operation of automatic reactive power control circuit 48 under this preset value change, the margin angle γ is decreased and the operating point is shifted from P1 to a point P3. Since point P3 is on the minimum margin angle γmin curve, further reduction in the margin angle γ is no longer effected. Therefore, the decrease in the margin angle γ is stopped at point P3.

At point P3, since the detected margin angle γ reaches the reference level γmin, detector 53 supplies output E53 to MMV 55 so that OFF instruction I(XSRB) is generated. Further, since the logic level of signal XSRB is "1", ON instruction I(YSCB) with logic "1" level is generated from AND gate 57. By this ON instruction I(YSCB), breaker 50B is closed and shunt capacitor 52B is connected to AC line 6B. Then, the operating point is once shifted from P3 to a point P4. Following this, the operating point is shifted from P4 to P2 by the automatic reactive power control operation of circuit 48.

If the operating point is to be shifted from P2 to P1, the operation of FIG. 4 circuit will be as follows.

When the preset value (E45) of the reactive power is changed from QB to QA, the margin angle γ is increased by the automatic reactive power control operation of circuit 48. When the margin angle γ is further increased to γmin+Δγ, MMV 56 generates OFF instruction I(XSCB). Then, breaker 50B is opened and shunt capacitor 52B is disconnected from AC line 6B, so that the operating point is shifted to P1.

In the above embodiment, the margin angle $\gamma$ may be detected directly from converter (inverter) 1B being operated in a high voltage. However, such a direct detection of the margin angle $\gamma$ is not recommendable from the viewpoints of cost and reliability. Rather, although an accurate detection of the margin angle $\gamma$ is relatively difficult, it is practicable to obtain the margin angle $\gamma$ by an arithmetic manner in accordance with the DC current Id, the DC voltage on the winding of transformer 4B, the commutation impedance thereof, etc.

Figure 6:
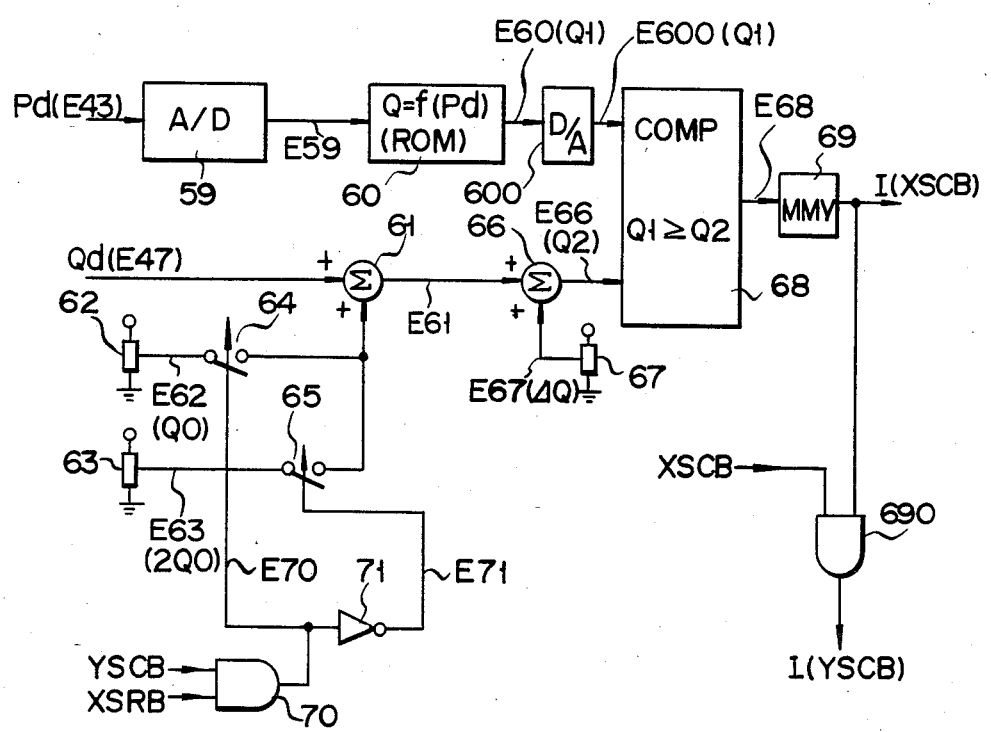
FIG. 6 shows another circuit for controlling the connection of a shunt capacitor (or shunt reactor), which is another essential part of the present invention.

FIG. 6 shows another circuit for controlling the connection of a shunt capacitor (or shunt reactor), in which a value (Q1) corresponding to the minimum margin angle $\gamma$min and a value (Q2) corresponding to the margin angle $\gamma$ are detached.

In the following, to avoid a lengthy explanation, descriptions will be given mainly to a case wherein the connection of a shunt capacitor (52B) of an inverter (1B) side is controlled.

In FIG. 6, analog information of the detected active power Pd (output E43 in FIG. 3) is supplied to an A/D converter 59. A/D converter 59 generates digital data E59 corresponding to Pd. Data E59 is supplied to a code converter 60. Converter 60 may be formed of a read-only memory (ROM) which performs a code conversion of a prescribed function "Q=f(Pd)". In this case, data E59 is used as address data for ROM 60. ROM 60 stores data of reactive power Q corresponding to the detected active power Pd, i.e., it stores data of the $\gamma$min curve A - B shown in FIG. 2.

When data E59 is supplied, ROM 60 provides data E60 which represents a reactive power value Q1 on the $\gamma$min curve A - B. Thus, value Q1 corresponding to the minimum margin angle $\gamma$min is obtained by means of the functional conversion in ROM 60. However, this $\gamma$min curve A - B is obtained in a case where shunt capacitor 52B is connected to AC line 6B. Thus, when shunt capacitor 52B is disconnected from AC line 6B (or when shunt reactor 51B is connected to AC line 6B), the $\gamma$min curve deviates from the curve A - B, as seen from the illustration of FIG. 2. In practice, it is not recommendable to prepare independent plural ROMs 60 for respective connection states of shunt reactor 51B and shunt capacitor 52B (three ROMs are required in this case).

Figure 2:
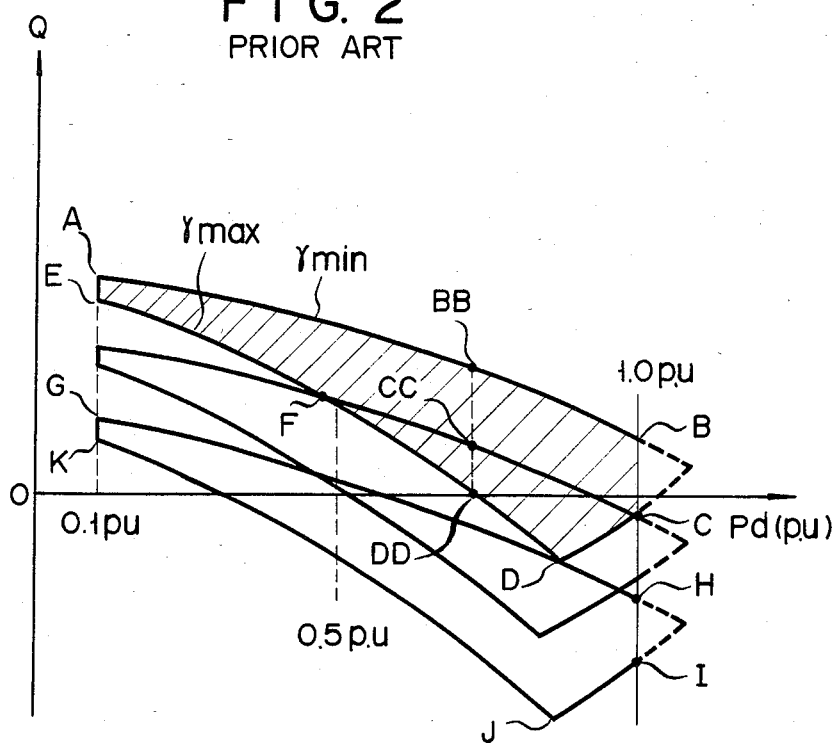
FIG. 2 is a graph showing the relationship between transmission power (detected active power) Pd and reactive power Q of a conventional DC power transmission system.

Here, it should be reminded that the curve A - B in FIG. 2 is shifted parallel along the Q axis upon ON/OFF operation of breakers 49B and 50B. From this, the following configuration is employed in the FIG. 6 circuit, so that a complete operation of the phase modifying equipment is achieved by a single ROM.

In FIG. 6, analog information of the detected reactive power Qd (output E47 in FIG. 3) is supplied to an adder 61. Adder 61 also receives a signal corresponding to the reactive power capacity of shunt reactor 51B and shunt capacitor 52B. Assume that each reactive power capacity of reactor 51B and capacitor 52B is represented by QO. Then, a potentiometer 62 provides a signal E62 corresponding to the reactive power capacity QO, and a potentiometer 63 provides a signal E63 corresponding to the reactive power capacity 2QO. Signal E62 is supplied to adder 61 via a switch 64. Signal E63 is supplied to adder 61 via a switch 65.

Switch 64 is turned on by a signal E70 with logic level "1" which is obtained from an AND gate 70.

Switch 65 is turned on by a signal E71 with logic level "1" which is obtained from an inverter 71. AND gate 70 is responsive to ON signal YSCB and OFF signal XSRB, and generates signal E70 representing the logical AND of YSCB and XSRB. Signal E71 is obtained by inverting the phase of signal E70.

An output E61 (Qd+Qo or Qd+2Qo) from adder 61 is supplied to an adder 66. Adder 66 also receives a signal E67 from a potentiometer 67. Signal E67 indicates a predetermined value $\Delta Q$. Adder 66 provides a signal E66 representing a reactive power value Q2 which corresponds to E61+$\Delta Q$ and also to the margin angle $\gamma$. The value $\Delta Q$ serves to prevent undesirable frequent ON/OFF actuations of breaker 50B. Such frequent ON/OFF actuations could be caused by frequent generations of ON/OFF instructions I(YSCB)/I(XSCB) at the same Q (or $\gamma$) value.

Digital data E60 (Q1) is converted via a D/A converter 600 to a corresponding analog signal E600. Signal E600 (Q1) is supplied to a level comparator 68. Comparator 68 also receives signal E66 (Q232 E61+$\Delta Q$). The level of signal E600 (Q1) is compared with that of signal E66 (Q2) in comparator 68. When E600≧E66 or Q1≧Q2 is established, comparator 68 generates an ouput E68 with logic level "1". The rising edge of output E68 triggers an MMV 69. When triggered, MMV 69 generates OFF instruction I(XSCB) with a given pulse width. This instruction I(XSCB) renders breaker 50B opened so that shunt capacitor 52B is disconnected from AC line 6B.

OFF instruction I(XSCB) is supplied to an AND gate 690. AND gate 690 also receives signal XSCB. If instruction I(XSCB) is generated under XSCB="1" (capacitor 52B has been disconnected from AC line 6B in this case), AND gate 690 provides ON instruction I(YSCB) with logic level "1". Then, breaker 50B is closed and shunt capacitor 52B is connected to AC line 6B.

Figure 7:
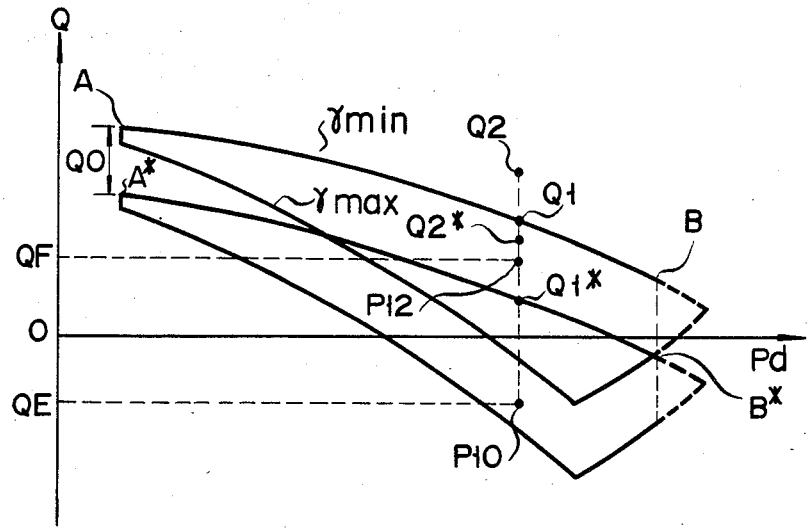
FIG. 7 is a graph showing the relationship between transmission power (detected active power) Pd and reactive power Q, which is obtained by the operation of the FIG. 6 circuit and corresponds to the illustration of FIG. 5.

FIG. 7 is a graph showing the relationship between transmission power (detected active power) Pd and reactive power Q. This relationship is obtained by the operation of the FIG. 6 circuit and corresponds to the illustration of FIG. 5.

Assume that reactive powers at operating points P10 and P12 are denoted by QE and QF, respectively, and the operating point is to be changed from point P12 to point P10. Before this operating point change, the detected reactive power Qd is equal to QF. In this case, shunt reactor 51B is disconnected from AC line 6B, while shunt capacitor 52B is connected to AC line 6B. Then, signal XSRB is logic "1" and signal YSCB is logic "1", so that signal E70 is logic "1" and signal E71 is logic "0". From this, switch 64 is turned on and switch 65 is turned off, and the following relation holds:

$$Q2\ (E66) = Qd\ (QF) + QO + \Delta Q \tag{1}$$

A point Q2 in FIG. 7 represents the above value Q2 of Eq. (1). When the margin angle $\gamma$ is increased by the automatic reactive power control operation of circuit 48 in FIG. 3, the detected reactive power Qd is reduced so that the value Q2 in Eq. (1) is decreased. From this, point Q2 is shifted downward. When E600=E66 or Q1=Q2 is established, i.e., when point Q2 reaches a point Q1 on the $\gamma$min curve A - B, OFF instruction I(XSCB) is generated from MMV 69 so that shunt capacitor 52B is disconnected from AC line 6B. When capacitor 52B is disconnected, the operating point is once shifted from Q1 to a point Q1* on another γmin curve A* - B* and, subsequently, the operating point is further shifted from Q1* to P10 by the automatic reactive power control operation of circuit 48.

When the operating point is to be changed from point P10 to point P12, the FIG. 6 circuit will operate as follows.

Before this operating point change, the detected reactive power Qd is equal to QE. In this case, both shunt reactor 51B and shunt capacitor 52B are disconnected from AC line 6B. Then, signal XSRB is logic "1", signal XSCB is logic "1" and signal YSCB is logic "0". From this, signal E70 is logic "0" and signal E71 is logic "1"; switch 64 is turned off and switch 65 is turned on; and the following relation holds:

$$Q2\ (E66) = Qd(QE) + 2QO + \Delta Q \qquad (2)$$

A point Q2* in FIG. 7 represents the value Q2 of Eq. (2). (The difference (=Qo) between Q2 of Eq. (2) and Q2 of Eq. (1) corresponds to the value Δγ in FIG. 4.) When the margin angle γ is increased by the automatic reactive power control operation of circuit 48, the detected reactive power Qd is reduced so that the value Q2 in Eq. (2) is decreased. From this point Q2* is shifted downward. When E600=E66 is detected by comparator 68 in FIG. 6, or when point Q2* reaches point Q1* on the γmin curve A* - B*, OFF instruction I(XSCB) is generated under XSCB ="1". In this case, AND gate 690 provides ON instruction I(YSCB) so that shunt capacitor 52B is connected to AC line 6B. Then, the operating point is once shifted from Q1* to Q1 and, subsequently, the operating point is further shifted from Q1 to P12 by the automatic reactive power control operation of circuit 48.

The above explanation is given to a case wherein at an initial stage, shunt reactor 51B is disconnected while shunt capacitor 52B is connected, or a case wherein both shunt reactor 51B and shunt capacitor 52B are disconnected at an initial stage. However, a similar explanation may be applied to a case wherein shunt reactor 51B is connected while shunt capacitor 52B is disconnected at an initial stage. Here, if the reference symbols I(XSCB), I(YSCB), XSCB, YSCB and XSRB are replaced with I(YSRB), I(XSRB), YSRB, XSRB and YSCB, respectively, the FIG. 6 circuit can be used for controlling the connection of shunt reactor 51B.

The present invention has been described with reference to a case wherein reactive power of the AC line is controlled. However, the present invention may be applied to a case wherein an AC voltage of the AC line is controlled. In this case, the increment/decrement in the AC voltage corresponds to the product of the increment/decrement in the reactive power and the reactance component of the AC line.

The present invention should not be limited to the embodiments disclosed herein. Various changes or modifications may be made without departing from the scope of the invention as claimed. For instance, the present invention may be applied to a converter control system of U.S. patent application Ser. No. 622,877 filed on June 21, 1984; the inventors of which are the same as those of the present application. Further, the present invention may be applied to a power converter control apparatus and power converter control method of Japanese Patent Applicatio No. 59-61363 filed on Mar. 29, 1984; one inventor of which is the same as that of the present application. (A new U.S. patent application corresponding to this Japanese patent application has been filed, but its filing serial number is not known at present.)

To amplify the disclosure, all contents of the above U.S. patent application and Japanese Patent Application (inclusive of the corresponding U.S. patent application) are incorporated in the present application.

What is claimed is:

1. A control method of phase modifying equipment which is adapted to a DC power transmission system, wherein reactive power of an AC line coupled to the DC power transmission system is controlled in accordance with a margin angle, said control method comprising the steps of:
   (a) when said margin angle reaches a given minimum margin angle, a phase-advancing reactance element being disconnected from said AC line; and
   (b) when said margin angle exceeds said given minimum margin angle by a predetermined value, said phase-advancing reactance element being connected to said AC line.

2. A control method of phase modifying equipment which is adapted to a DC power transmission system, wherein reactive power of an AC line coupled to the DC power transmission system is controlled in accordance with a margin angle, said control method comprising the steps of:
   (a) when said margin angle reaches a given minimum margin angle, a phase-delaying reactance element being connected to said AC line; and
   (b) when said margin angle exceeds said given minimum margin angle by a predetermined value, said phase-delaying reactance element being disconnected from said AC line.

3. A control apparatus of phase modifying equipment which is adapted to a DC power transmission system, wherein reactive power of an AC line coupled to the DC power transmission system is controlled in accordance with a margin angle, said control apparatus comprising:
   (a) first means, when said margin angle reaches a given minimum margin angle, for disconnecting a phase-advancing reactance element from said AC line; and
   (b) second means, when said margin angle exceeds said given minimum margin angle by a predetermined value, for connecting said phase-advancing reactance element to said AC line.

4. A control apparatus of phase modifying equipment which is adapted to a DC power transmission system, wherein reactive power of an AC line coupled to the DC power transmission system is controlled in accordance with a margin angle, said control apparatus comprising:
   (a) primary means, when said margin angle reaches a given minimum margin angle, for connecting a phase-delaying reactance element to said AC line; and
   (b) secondary means, when said margin angle exceeds said given minimum margin angle by a predetermined value, for disconnecting said phase-delaying reactance element from said AC line.

5. A control apparatus according to claim 3, wherein said first means includes means for comparing said margin angle with said given minimum margin angle, and disconnecting said phase-advancing reactance element from said AC line when said margin angle corresponds to said given minimum margin angle; and wherein said second means includes means for comparing said margin angle with a specific value which is defined by the sum of said given minimum margin angle and said predetermined value, and connecting said phase-advancing reactance element to said AC line when said margin angle corresponds to said specific value.

6. A control apparatus according to claim 4, wherein said primary means includes means for comparing said margin angle with said given minimum margin angle, and connecting said phase-delaying reactance element to said AC line when said margin angle corresponds to said given minimum margin angle; and wherein said secondary means includes means for comparing said margin angle with a specific value which is defined by the sum of said given minimum margin angle and said predetermined value, and disconnecting said phase-delaying reactance element from said AC line when said margin angle corresponds to said specific value.

7. A control apparatus according to claim 3, further comprising:
   active power means for detecting active power handled by said DC power transmission system, and generating an active power signal;
   reactive power detector means for detecting reactive power handled by said DC power transmission system, and generating a reactive power signal; and
   comparator means coupled to said active power detector means and said reactive power detector means, for comparing a first value corresponding to said active power signal with a second value corresponding to said reactive power signal, and controlling a connecting state of said phase-advancing reactance element according to a condition that said first value corresponds to said second value.

8. A control apparatus according to claim 7, wherein said comparator means includes means for changing said second value by a predetermined amount in accordance with the connecting state of said phase-advancing reactance element.

9. A control apparatus according to claim 4, further comprising:
   active power detector means for detecting active power handled by said DC power transmission system, and generating an active power signal;
   reactive power detector means for detecting reactive power handled by said DC power transmission system, and generating a reactive power signal; and
   comparator means coupled to said active power detector means and said reactive power detector means, for comparing a first value corresponding to said active power signal with a second value corresponding to said reactive power signal, and controlling a disconnecting state of said phase-delaying reactance element according to a condition that said first value corresponds to said second value.

10. A control apparatus according to claim 9, wherein said comparator means includes means for changing said second value by a predetermined amount in accordance with the connecting state of said phase-delaying reactance element.

* * * * *